(No Model.)
E. E. FAY.
VELOCIPEDE WHEEL.
No. 520,845.                     Patented June 5, 1894.
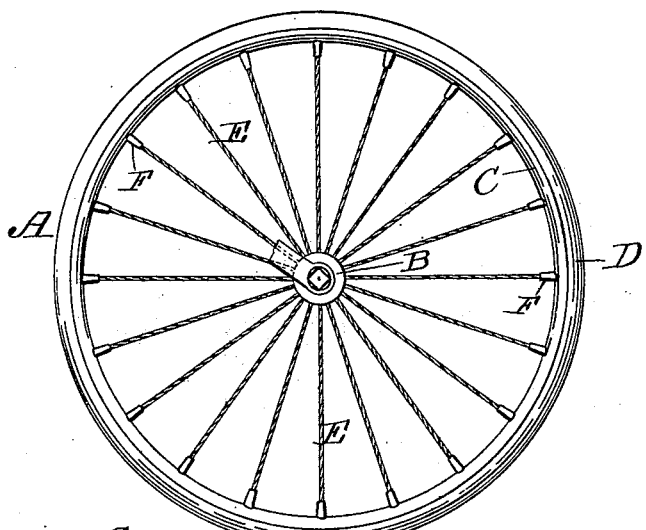
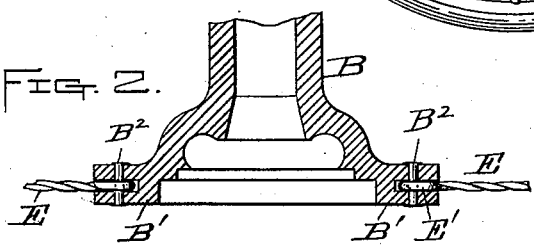
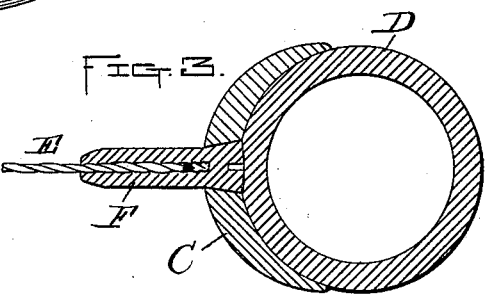
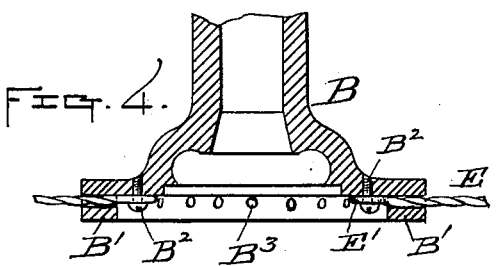
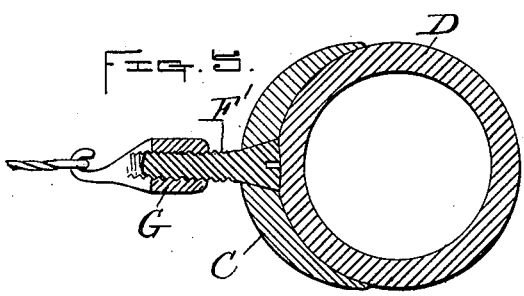
Witnesses;
W. B. Nourse,
Fred E. Buss.
Inventor;
Edgar E. Fay.
By A. A. Barker, Atty

UNITED STATES PATENT OFFICE.

EDGAR E. FAY, OF WORCESTER, MASSACHUSETTS.

VELOCIPEDE-WHEEL.

SPECIFICATION forming part of Letters Patent No. 520,845, dated June 5, 1894.

Application filed August 11, 1892. Serial No. 442,803. (No model.)

*To all whom it may concern:*

Be it known that I, EDGAR E. FAY, of the city and county of Worcester and State of Massachusetts, have invented certain new and useful Improvements in Velocipede-Wheels; and I do hereby declare that the following is a full, clear, and exact description thereof, reference being had to the accompanying drawings, forming a part of this specification, and in which—

Figure 1 represents a velocipede wheel embodying my improvement. Fig. 2 is an enlarged, central, longitudinal section through one end of the hub thereof, showing part of the spokes on opposite sides. All the following figures are also upon an enlarged scale. Fig. 3 is a transverse section through the rim and tire of the wheel, also showing the outer end of one of the spokes and means for holding it. Figs. 4 and 5 are similar views to Figs. 2 and 3 respectively, showing modifications in the construction which will be hereinafter described.

Said invention relates to said spokes and the mode of fastening the ends thereof to the hub and rim of the wheel, and more particularly to the wheels of what are commonly known as "safety" bicycles.

It consists in combining spokes composed of twisted wire, and in combining spokes thus made with the hub and rim, and means of fastening said spokes thereto, as will be hereinafter more fully set forth.

In order that others may better understand the nature and purpose of my said invention, I will now proceed to describe it more in detail.

In the drawings A represents the front wheel of a "safety" bicycle; B the hub; C the rim; D the tire, and E my improved spokes previously alluded to. Said spokes are made of highly tempered steel wire of the proper size, doubled to form a loop $E'$ at one end, and the two halves intertwisted as shown. In some cases a loop is formed at both ends according to the way of fastening, an illustration of which is shown in Figs. 4 and 5. I prefer, however, the first described construction of forming the loop only on one end and twisting the other end out to the terminus of the double wire, and of fastening said twisted end to the rim of the wheel by turning it into a longitudinally threaded opening in a screw or bolt F, held by its head in an opening in said rim, said threaded opening being made to correspond to the size and twist of the spoke, so that the latter may be turned endwise therein similar to an ordinary threaded end or screw. The loop end may be fastened by passing the same into an annular, transverse groove or recess in the laterally projecting flange $B'$ of hub B, and passing a pin $B^2$ transversely through said loop and flange, as is shown in Fig. 2; or by passing the spoke through one of the transverse openings $B^3$ in the flange $B'$ and a screw or pin through the loop into the flange, as is shown in Fig. 4, or in any other suitable and convenient manner. When a loop is used on both ends of the spoke, the outer or rim end may be fastened by hooking the loop to a suitable nut G, (see Fig. 5,) which may be turned on the screw $F'$ corresponding to the screw or bolt F shown in Fig. 3. By either of the constructions shown in said Figs. 3 and 5, it will be seen that the spokes may be tightened or loosened at will, in Fig. 3 by turning the screw or bolt, and in Fig. 5 by turning the nut.

By constructing a velocipede wheel as hereinbefore described it is obvious that the same is rendered very light in weight, strong and durable, as well as economical in construction.

Having now described my invention, what I claim as new, and desire to secure by Letters Patent, is—

A velocipede wheel comprising in combination the hub B having a laterally projecting annular flange $B'$ adapted to receive and hold the inner ends of the spokes E and means for fastening said ends of the spokes thereto; said spokes E composed of doubled and twisted wire and having a loop at one or both ends; the usual tire D fitted in rim C; said rim C having radial, transverse openings therethrough in line with the spokes to receive the spoke-holding and tightening screws F; said screws F fitted in said openings with their heads next to the tire D, and means whereby the outer ends of the spokes may be attached to said holding and tightening screws, substantially as and for the purpose set forth.

EDGAR E. FAY.

Witnesses:
A. A. BARKER,
W. B. NOURSE.